（12） United States Patent  (10) Patent No.: US 8,989,025 B2
Kazmi et al.  (45) Date of Patent: Mar. 24, 2015

(54) UE TIMING ADJUSTMENT IN A MULTI-RAT, CARRIER AGGREGATION COMMUNITY SYSTEM

(75) Inventors: Muhammad Kazmi, Bromma (SE); Rong Hu, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 350 days.

(21) Appl. No.: 13/023,139

(22) Filed: Feb. 8, 2011

(65) Prior Publication Data

US 2012/0120821 A1 May 17, 2012

Related U.S. Application Data

(60) Provisional application No. 61/412,960, filed on Nov. 12, 2010.

(51) Int. Cl.

| H04L 12/26 | (2006.01) |
| H04W 72/12 | (2009.01) |
| *H04W 56/00* | (2009.01) |
| H04W 28/04 | (2009.01) |
| H04W 74/02 | (2009.01) |
| H04W 88/06 | (2009.01) |
| H04L 5/00 | (2006.01) |

(52) U.S. Cl.
CPC ...... *H04W 72/1215* (2013.01); *H04W 56/0005* (2013.01); *H04W 56/0045* (2013.01); *H04W 28/04* (2013.01); *H04W 74/02* (2013.01); *H04W 88/06* (2013.01); *H04L 5/001* (2013.01)
USPC ........................................................ 370/252

(58) Field of Classification Search
None
See application file for complete search history.

(56) References Cited

U.S. PATENT DOCUMENTS

2006/0063556 A1 3/2006 Palenius et al.
2006/0280142 A1 12/2006 Damnjanovic et al.
(Continued)

FOREIGN PATENT DOCUMENTS

EP 1 821 429 8/2007
EP 1821429 A2 * 8/2007
(Continued)

OTHER PUBLICATIONS

3GPP REV-090003r1, IMT-Advanced Evaluation Workshop Dec. 17-18, 2009, Beijing, LTE-Advance Physical Layer, p. 24.*
(Continued)

*Primary Examiner* — Kouroush Mohebbi

(57) ABSTRACT

A common uplink timing adjustment parameter value is estimated for UE transmissions in the multi-RAT communications network and provided for transmission to one or more UEs. That signaling parameter value is common to both the first and second RATs and useable by the one or more UEs to adjust transmit timing of uplink carriers belonging to the different RATs. The common timing adjustment parameter value may be provided, for example, in order to coordinate UE transmit timing of a first uplink carrier associated with the first RAT and of a second uplink carrier associated with the second RAT. A multi-RAT UE concurrently receives a first downlink carrier associated with the first RAT and a second different downlink carrier associated with the second RAT. The UE receives the common timing adjustment parameter value on one of those downlink carriers and adjusts a transmit timing of a first uplink carrier associated with the first RAT and of a second uplink carrier associated with the second RAT.

34 Claims, 7 Drawing Sheets

(56) References Cited

U.S. PATENT DOCUMENTS

| | | | |
|---|---|---|---|
| 2008/0081629 A1 | 4/2008 | Piipponen et al. | |
| 2010/0085956 A1* | 4/2010 | Ahn et al. | 370/344 |
| 2011/0158116 A1 | 6/2011 | Tenny et al. | |
| 2011/0235620 A1 | 9/2011 | Ahn et al. | |
| 2011/0268048 A1* | 11/2011 | Toskala et al. | 370/329 |
| 2012/0008600 A1* | 1/2012 | Marinier et al. | 370/336 |
| 2012/0113939 A1 | 5/2012 | Kim et al. | |

FOREIGN PATENT DOCUMENTS

| | | |
|---|---|---|
| EP | 1 871 035 | 12/2007 |
| EP | 2230870 | 9/2010 |
| GB | 2410860 | 8/2005 |
| WO | WO 2009/149565 | 12/2009 |

OTHER PUBLICATIONS

PCT International Search Report mailed Aug. 5, 2011, in International Application No. PCT/EP2011/054708.

Written Opinion mailed Aug. 5, 2011, in International Application No. PCT/EP2011/054708.

U.S. Appl. No. 12/869,693, filed Aug. 26, 2010; Inventor: Andgart et al.

International Search Report and Written Opinion mailed Mar. 12, 2012 in corresponding Application No. PCT/SE2011/051300.

3GPP TSG-RAN WG2#68bis; R2-100372; Jan. 18-22, 2010; Valencia, Spain; Nokia Corporation, Nokia Siemens Networks; RACH and carrier aggregation; Jan. 12, 2010; http://www.3gpp.org/ftp/tsg_ran/WG2_RL2/TSGR2_68bis/docs/; Chapters 2 and 3.

3GPP TSG-RAN2#69; R2-101567; Feb. 22-26, 2010; San Francisco, USA; NTT Docomo, Inc; CA support for multi-TA; Feb. 18, 2010; http://www.3gpp.org/ftp/tsg_ran/WG2_RL2/TSGR2_69/docs/; Chapter 2.1.

Office Action mailed Jan. 7, 2013 in U.S. Appl. No. 12/869,693, pp. 1-22.

Office Action mailed Apr. 25, 2013 in U.S. Appl. No. 12/869,693, pp. 1-14.

PCT International Report on Patentability, mailed Oct. 11, 2012 in PCT/EP2011/054708.

* cited by examiner

UE TIMING ADJUSTMENT IN A MULTI-RAT, CARRIER AGGREGATION COMMUNITY SYSTEM

RELATED APPLICATIONS

This application claims priority from U.S. provisional application 61/412,960, filed on Nov. 12, 2010, entitled "UE Timing in Multi-RAT Carrier Aggregation," the contents of which are incorporated herein by reference. In addition, commonly-assigned U.S. patent application Ser. No. 12/869,693, filed on Aug. 26, 2010, entitled "Timing of Uplink Transmissions in a Multi-carrier Communications System," is incorporated herein by reference.

TECHNICAL FIELD

The technology relates to radio communications, and in particular, to radio communication systems in which multiple different radio access technologies (RATs) are available.

BACKGROUND

Today, there are many radio and cellular access technologies and standards such as GSM/GPRS, WCDMA/HSPA, CDMA-based technologies, WiFi, WiMAX, and LTE, to name a few. These technologies and standards have been developed during the last few decades, and it can be expected that the development will continue. The technology in this application primarily focuses on the high speed packet access (HSPA)-evolution built on the WCDMA radio access also called UTRAN, and LTE, which is based on OFDM and SC-FDMA, also recognized as the Long Term Evolution of UTRAN, or E-UTRAN.

Multi-carrier or carrier aggregation may be used to enhance peak-rates within a radio access technology (RAT). For example, it is possible to use multiple 5 MHz carriers in a HSPA-based RAT to enhance the peak-rate within the HSPA network. Similarly, there is a plan for LTE Release 10 to facilitate aggregation of multiple LTE carriers, e.g., aggregation of multiple 20 MHz carriers. In forthcoming evolutions of cellular system standards like the Third Generation Partnership Project's (3GPP's) Long Term Evolution ("LTE") the maximum data rate is sure to be higher than in existing systems. Higher data rates typically require larger system radio spectrum bandwidths. For the International Mobile Telecommunications-Advanced ("IMT-Advanced") system (i.e., the fourth generation mobile communication systems) bandwidths up to 100 MHz are being discussed. A problem being faced is that the radio spectrum is a limited resource that has to be shared by many operators and systems; this makes it very complicated to find 100 MHz of free contiguous spectrum that can be allocated.

One method of overcoming this problem is aggregating contiguous and non-contiguous spectrum. FIG. 1 below shows an aggregation of two 20 MHz bands 201, 203 and one 10 MHz band 205. The 20 MHz band 203 and the 10 MHz band 205 are contiguous, whereas the 20 MHz band 201 is separated from the 20 MHz and 10 MHz bands 203, 205 by some amount of spectrum 207. The benefit of such a solution is that it becomes possible to generate sufficiently large bandwidths (e.g., 50 MHz in the example of FIG. 1) for supporting data rates up to (and above) 1 Gb/s, which is a throughput requirement for a fourth generation ("4G" or IMT-advanced) system. The ability to utilize an aggregation of noncontiguous as well as contiguous bands of the radiofrequency spectrum makes it possible for communication system operators to adapt which parts of the radio spectrum will be used based on present circumstances and geographical position Each carrier in multi-carrier or carrier aggregation system is generally termed as a component carrier (CC) or sometimes is also referred to a "cell" (not to be confused with a geographical cell area). A component carrier (CC) is an individual carrier in a multi-carrier system. Carrier aggregation (CA) is also called "multi-carrier system," "multi-carrier operation," and "multi-carrier" transmission and/or reception. CA is used for transmission of both signaling and data in the uplink and downlink directions. One of the CCs is the primary carrier or anchor carrier, and the remaining CCs are called secondary or supplementary carriers. Generally, the primary or anchor CC carries the important UE-specific signaling. The primary CC exists in both uplink and downlink directions. The network may assign different primary carriers to different UEs operating in the same sector or cell.

The CCs belonging to the CA may belong to the same frequency band (intra-band CA), to different frequency bands (inter-band CA), or a combination thereof (e.g. 2 CCs in band A and 1 CC in band B). Furthermore, the CCs in intra-band CA may be adjacent or non-adjacent in the frequency domain (intra-band non-adjacent CA). A hybrid CA comprising intra-band adjacent, intra-band non-adjacent, and inter-band is also possible.

For an operator with a certain bandwidth that must deploy two or more radio access technologies (RATs), e.g., HSPA and LTE, if the bandwidth offered in the specific or individual RAT technology is limited to part of the given bandwidth, these carrier aggregation approaches within a RAT cannot fully utilize the whole operator bandwidth. To solve this problem, simultaneous use of multiple radio access technologies (RATs) may be used, i.e., multi-RAT carrier aggregation. Multi-RAT carrier aggregation is also termed as multi-RAT multi-carrier, inter-RAT CA, inter-RAT multi-carrier etc. For consistency, the term multi-RAT carrier aggregation (CA) is used. A multi-RAT CA scenario may include adjacent carriers and/or non-adjacent carriers. Non-adjacent carriers may or may not belong to the same frequency band which means that multi-RAT CA may be intra-band (all RATs in same band) or inter-band (at least 2 RATs/carriers in different bands). Non-limiting examples of other multi-RAT CA scenarios are: 1) LTE and CDMA2000, 2) LTE and GSM, 3) LTE, HSPA, and GSM, etc.

FIG. 2 shows an example multi-RAT cellular communication system with an LTE-based RAT serving cell area 105 and an HSPA-based RAT servicing cell area 109. The LTE base station is an evolved Node B (eNodeB or eNB) 101 that serves a user equipment (UE) 103 located within the serving node's geographical service cell 105. The HSPA base station is a Node B 107 that serves UE 103 located within the serving node's geographical service cell 109. Communication is bidirectional between each base station and the UE 103. Communications from each base station to the UE 103 are referred to as taking place in a downlink (DL) direction, and communications from the UE 103 to the eNB 101 are referred to as taking place in an uplink (UL) direction.

FIG. 3 shows an example of multi-RAT carrier aggregation of two carriers (HSPA & LTE) with HSPA acting as the "master" system. In this example, the first radio access technology (RAT) corresponds to the HSPA carrier and the second RAT to the LTE carrier. MAC-i/is PDUs (protocol data units) are generated at the UE and further distributed over the two different access technologies. The MAC-i/is PDUs are separately transmitted by the UE over the physical layers (L1) of the two different RATs using HSPA and LTE carriers. The Node B receives and demodulates the two carriers, and respective Hybrid ARQ (HARQ) entities at the NodeB operate separately on each carrier. Once successful decoding occurs on either or both carriers, the MAC-i/is PDUs are forwarded to the MAC-i layer of the "master" (HSPA) system where the PDUs from the two different carriers are aggregated. The aggregated MAC-i/is PDUs are then transmitted from the NodeB to the RNC over the Tub interface. In the RNC, the MAC-is PDUs may then be further processed for delivery to higher layers like the RLC protocol, which supports, among other things, selective repeat ARQ and encryption of user-plane data.

In multi-RAT carrier aggregation where HSPA and LTE are used simultaneously by both the NodeB and the UE, it is desirable for the UE to be able to simultaneously receive data from LTE and HSPA carriers and to simultaneously transmit data over LTE and HSPA carriers. The LTE and HSPA carriers should also be time-aligned to reduce UE complexity, processing, and cost.

Control signaling should also be considered for multi-RAT carrier aggregation. One control channel (i.e., HS-DPCCH or PUCCH) may be used to send feedback information (e.g., ACK/NACK, CQI, etc.) related to both RAT systems (HSPA and LTE). Using one control channel has a number of advantages including reducing signaling overheads, eliminating control channel bottleneck (a larger number of users results in delay in scheduling with a single control channel, but with two control channels in an overload situation on just one of them, it is possible that a UE cannot be scheduled on that overloaded control channel), reducing UE power backoff (cubic metric) in HSPA (in HSPA, the HS-DPCCH channel requires the UE to apply larger power backoff as compared to the PUCCH in LTE so using the PUCCH leads to less loss of the uplink coverage due to lower UE power backoff), and reducing BS complexity because only one control channel needs to be demodulated.

There are several characteristics of a control channel to consider. For example, the control channel is typically sent on the carriers of the primary RAT system. The uplink (UL) control channel is typically sent by a UE a fixed offset time period after downlink (DL) reception. Given that the same UL control channel typically carries feedback information for both RATs, multiple DL data channel transmissions should be received by the UE at about the same time. Otherwise, the UE has less time for processing the UL control channel because the offset time is fixed from the last received DL data channel transmission. As a result, the UE has to store information for a longer time which undesirably increases UE memory requirements.

One important aspect of cellular communication is to keep the uplink and downlink signals synchronized with one another between the base station and the user equipment. The UE transmit timing for uplink channels (e.g., RACH, UL data channel, UL control channel etc.) may be regularly adjusted for various reasons, e.g., for maintaining the UL orthogonality of uplink signals received from multiple UEs at a base station, for maintaining a fixed timing relation between the UL and DL timing, to compensate for the propagation delay between the UE and the base station, etc. In order to maintain orthogonality between multiple UE signals in the uplink direction, a timing adjustment parameter value typically needs to be sent from the network node to the user equipment.

For UE transmit timing in LTE, the eNode B adjusts the UE transmit timing by sending a timing advance command (an example of a timing adjustment (TA) parameter value) to the UE and a cell-specific reference signal (CRS) (an example of a timing reference signal broadcast by a base station). Each timing advance command tells the receiving user equipment at what moment it should begin transmitting its signals to the eNB (e.g., this can be expressed as a timing offset from a system reference timing). The timing advance command may be determined by the eNode B, e.g., by measuring the signals transmitted by the UE.

The eNode B transmit timing may drift over a period of time, e.g., due to temperature variation or due to the imperfections of the eNode B clock. Different UEs are usually distanced from the eNB by different amounts. With the propagation delay of a user equipment's signal to the eNB depending on the distance from the eNB to the user equipment, the UEs generally need to transmit their data at respectively different points in time in order for their transmitted signals to be synchronized with one another at the moment that they arrive at the eNode B receiver. In an effort to accomplish this, the UE automatically/autonomously adjusts its transmit timing using the timing advance command and a downlink cell-specific reference signal (CRS) received from the eNode B. The CRS signal is transmitted by the eNode B every sub-frame, e.g., to assist the UE in acquiring synchronization, performing demodulation, performing neighbor cell measurements, etc. The UE may also use other signals for UL timing adjustment. An example of such other signals includes synchronization signals, (i.e., a primary synchronization sequence (PSS)/a secondary synchronization sequence (SSS) in LTE).

Transmitting uplink signals in LTE using single carrier frequency division multiple access (SC-FDMA) technology requires that UL signals from all UEs received at the eNode B be orthogonal. The timing advance command in LTE ensures that the signals from all UEs in a cell are almost simultaneously received at the serving eNode B at about the same time regardless of their propagation delay thereby ensuring high degree of UL orthogonality. This is of increased importance in medium and large cells where there can be a large variation in the propagation delay of UEs in a cell.

In contrast to LTE, there is no Node B controlled timing advance command for adjusting the UE transmit timing in WCDMA. Instead, the UE automatically adjusts its transmit timing, e.g., if the Node B's DL transmit timing drifts, according to 3GPP TS 25.133 (see section 7.1.2) [1]. When the transmission timing error between the UE and the reference cell exceeds 1.5 chips, the UE must adjust its UL timing to within ±1.5 chips. The Node B needs to maintain the DL transmit timing of active cells within ±148 chips according to 3GPP TS 25.133 (see section 7.2.2). A UE must support reception, demodulation, and combining of signals of a downlink DPCH, or a downlink F-DPCH, when the receive timing is within a time window of T0±148 chips before the transmit timing, T0=1024 chips. In WCDMA, the uplink signals from different UEs may be received at different times. Hence, UL transmissions are not orthogonal in WCDMA.

Thus, one challenge with multi-RAT carrier aggregation is that different RATs on different carriers may have different timing and/or orthogonality requirements and different timing approaches.

For a multi-RAT carrier aggregation capable UE (e.g., HSPA+LTE), one approach to handle UE timing is for a UE to transmit an LTE carrier using LTE-specific rules, e.g., using a timing advance command to make automatic timing adjustments, and for the UE to transmit a WCDMA carrier using WCDMA-specific rules where the UE makes its own timing adjustments, e.g., without a timing advance command. But with these different timing adjustment approaches, the uplink transmit timings for the LTE and WCDMA carriers may drift apart. As a result, the Node B and eNode B may not be able to maintain the timing alignment between the DL carriers in the different RATs (e.g., HSPA and LTE). This means the UE may receive physical channels (e.g., HS-PDSCH and PDSCH in HSPA and LTE, respectively) containing data or signaling at different times so that there is a relative delay=$\Delta\tau$ between them. As a result, the UE cannot process the physical channels at substantially the same time. But as mentioned above, feedback signals from the UE, (such as ACK/NACK signaling), for both (or multiple) physical channels are sent over the same uplink control channel, (e.g., in the HS-DPCCH), within a certain offset time. Hence, a larger relative delay $\Delta\tau$ may lead to a reduced processing budget for HSPA or LTE carriers. A reduced processing budget leads to increased UE complexity, additional memory for storage, etc. It also leads to increased base station complexity (e.g., buffer size) in a RAN multi-RAT aggregation case, due to a possible longer packet reordering of a same user (on RLC layer or MAC layer) from LTE and HSPA with different timings. For a core network multi-RAT aggregation case, TCP time-outs could increase due to unsynchronized packets from two different radio systems.

Commonly-assigned U.S. patent application Ser. No. 12/869,693, filed on Aug. 26, 2010, entitled "Timing of Uplink Transmissions in a Multi-carrier Communications System," proposes that a multi-carrier capable UE select a reference downlink carrier and use the reference downlink carrier's timing to determine a transmission time period based on an offset specified by a timing advance (TA) command. The transmission time period comprises a start time and a stop time. The Ser. No. 12/869,693 application is UE-based, and there is no coordination between multiple RAT accesses on a radio network level. Consequently, for multi-RAT communication, the two or more radio access networks are not aware if the UE is using one timing advance command for all of the radio access networks. From a network performance perspective, it is desirable for all the UEs to have the same timing rule so that uplink orthogonality can be maintained. Therefore, the timing requirements and signaling should be pre-defined.

Another issue is that a reference downlink carrier and associated time advance command may not always be available. For example, in a scenario where a UE uses the HSPA as a master system, when there is a need or desire to start using another RAT, like LTE, so that more data can be transmitted, the Ser. No. 12/869,693 application does not describe determining or signaling a timing advance, which is necessary in LTE. Furthermore, for a multi-carrier or a multi-RAT system where more than one timing advance is available (e.g. TD-LTE, TD-SCDMA, GSM), the Ser. No. 12/869,693 application does not disclose determining a common timing advance from a network perspective for use by the UE in a multi-RAT carrier aggregation system.

SUMMARY

A first aspect of the technology described in this application includes a method of operating a user equipment (UE) in a multiple radio access technology (multi-RAT) communications system. The UE includes multi-RAT radio transmission circuitry and multi-RAT radio receiving circuitry. The multi-RAT radio receiving circuitry concurrently receives at least a first downlink carrier associated with a first RAT and at least a second different downlink carrier associated with a second RAT. A common timing adjustment parameter value that is common to both the first and second RATs is received on one of the first and second downlink carriers. The common timing adjustment parameter value is used to adjust a transmit timing of a first uplink carrier associated with the first RAT and of a second uplink carrier associated with the second RAT.

In a non-limiting example embodiment, the multi-RAT communications systems is a multi-RAT, multi-carrier communications system with the first RAT having a first group of uplink carriers and the second RAT having a second group of uplink carriers. The common timing adjustment parameter value is to adjust a transmit timing of one or more of the first group of uplink carriers and of one or more of the second group of uplink carriers. The common timing adjustment parameter value may also be used to ensure that signals transmitted from UEs in a cell area are approximately simultaneously received by a base station serving the cell area with a high degree of orthogonality. The first RAT and second RAT may be required to meet different uplink transmit and/or uplink orthogonality requirements. The common timing adjustment parameter value is based on one of the first and second RATs that requires uplink orthogonality between uplink signals received by a base station from different UEs.

In a non-limiting example embodiment, a transmit timing of one or more of the first group of uplink carriers and of one or more of the second group of uplink carriers may be adjusted using an uplink transmit timing that minimizes an uplink transmit timing error between different UEs transmitting to a base station. The first and second RATs may have different carrier bandwidths, in which case, a transmit timing of one or more of the first group of uplink carriers and of one or more of the second group of uplink carriers is adjusted using an uplink transmit timing associated with one of the carriers having a largest bandwidth.

In a non-limiting example embodiment, one of the one or more downlink carriers may be selected for use as a reference downlink carrier. A timing of the reference downlink carrier is ascertained, and a transmission time period is determined based on said ascertained timing of said downlink reference carrier and an offset specified by the common timing adjustment parameter value. The transmission time period comprises a transmission start time and a transmission stop time. The transmission circuitry initiates transmission of information on the one or both of the first and second uplink carriers based on the transmission start time and transmission stop time.

In a non-limiting example embodiment, a first common timing adjustment parameter value is associated with a first one of the first and second groups of uplink carriers and a second different common timing adjustment parameter value is associated with the same one of the first and second groups of uplink carriers. In one example implementation, the first and second groups of uplink carriers belong to different frequency bands.

The common timing adjustment parameter value can be received for example over a UE-specific channel or a common control channel.

An example of the first RAT is Long Term Evolution (LTE)-based, and an example of the second RAT is High Speed Packet Access (HSPA)-based.

Another aspect of the technology relates to a method in a multiple radio access technology (multi-RAT) communications network. Radio communications between the network and user equipments (UEs) are performed using multi-RAT radio transmission circuitry and multi-RAT radio receiving circuitry. A common uplink timing adjustment parameter value is estimated for UE transmissions in the multi-RAT communications network. The common uplink timing adjustment parameter value is provided for transmission to one or more UEs. The common uplink timing adjustment parameter value is common to both the first and second RATs and useable by the one or more UEs adjust transmit timing of uplink carriers belonging to two different RATs. The common timing adjustment parameter value may be provided, for example, in order to coordinate UE transmit timing of a first uplink carrier associated with the first RAT and of a second uplink carrier associated with the second RAT.

In a non-limiting example embodiment, the method is performed in a first network node, and the first network node signals the estimated timing adjustment parameter value to a second network node that then transmits the estimated timing adjustment parameter value to the one or more UEs. The first network node can be a base station that uses the first RAT technology, and the second network node can be another base station that uses the second RAT technology.

In a non-limiting example embodiment, the multi-RAT communications network is a multi-RAT, multi-carrier communications network with the first RAT having a first group of uplink carriers and the second RAT having a second group of uplink carriers. The common timing adjustment parameter value is used to coordinate a transmit timing of one or more of the first group of uplink carriers and of one or more of the second group of uplink carriers. In one example implementation, the common timing adjustment parameter value is used to ensure that signals transmitted from UEs in a cell area are approximately simultaneously received by a base station serving the cell area with a high degree of orthogonality. The first RAT and second RAT may have different uplink requirements or approaches, in which case, the common timing adjustment parameter value may be estimated based on one of the first and second RATs that requires uplink orthogonality between uplink signals received by a base station from different UEs.

In a non-limiting example embodiment, each of multiple base station nodes in the multi-RAT, multi-carrier communications network also broadcasts a downlink carrier timing reference signal that is separate from and additional to the common timing adjustment parameter value.

Another aspect of the technology relates to user equipment (UE) for use in a multiple radio access technology (multi-RAT) communications system. Multi-RAT radio circuitry is configured to concurrently receive at least a first downlink carrier associated with a first RAT and at least a second different downlink carrier associated with a second RAT, where one of the first and second downlink carriers includes a common timing adjustment parameter value that is common to both the first and second RATs. A data processor configured to use the common timing adjustment parameter value to adjust a transmit timing of a first uplink carrier associated with the first RAT and of a second uplink carrier associated with the second RAT.

Another aspect of the technology relates to apparatus in a multiple radio access technology (multi-RAT) communications network where radio communications between the network and user equipments (UEs) is performed using multi-RAT radio transmission circuitry and multi-RAT radio receiving circuitry. Electronic circuitry is configured to: estimate a common uplink timing adjustment parameter value for UE transmissions in the multi-RAT communications network, and provide the common uplink timing adjustment parameter value for transmission to one or more UEs. The common uplink timing adjustment parameter value is common to both the first and second RATs and useable by the one or more UEs adjust transmit timing of uplink carriers belonging to two different RATs. The common timing adjustment parameter value is provided in order to coordinate UE transmit timing of a first uplink carrier associated with the first RAT and of a second uplink carrier associated with the second RAT.

Base station nodes in the multi-RAT, multi-carrier communications network transmit a downlink carrier timing reference signal that is separate from and additional to the common timing adjustment parameter value.

In a non-limiting example embodiment, the apparatus is in a first network node configured to use one of the RATs and to signal the estimated timing adjustment parameter value to a second network node that uses the other of the RATs to transmit the estimated timing adjustment parameter value to the one or more UEs. In another non-limiting example embodiment, the apparatus is in a base station.

In a non-limiting example embodiment, the data processor is configured to estimate the common timing adjustment parameter value based on one of the first and second RATs that requires uplink orthogonality between uplink signals received by a base station from different UEs.

DESCRIPTION

Figure 1:
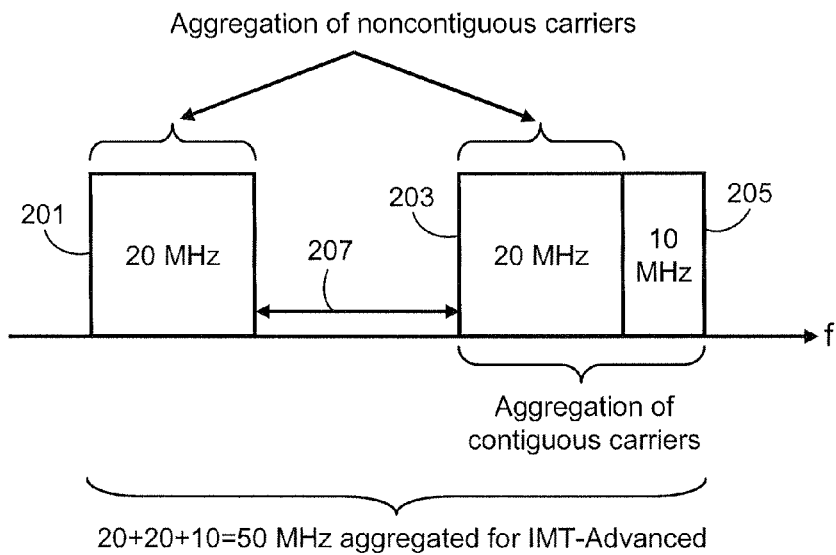
FIG. 1 is a diagram showing a multi-carrier system non-limiting example showing aggregation of contiguous and noncontiguous carriers.
Figure 2:
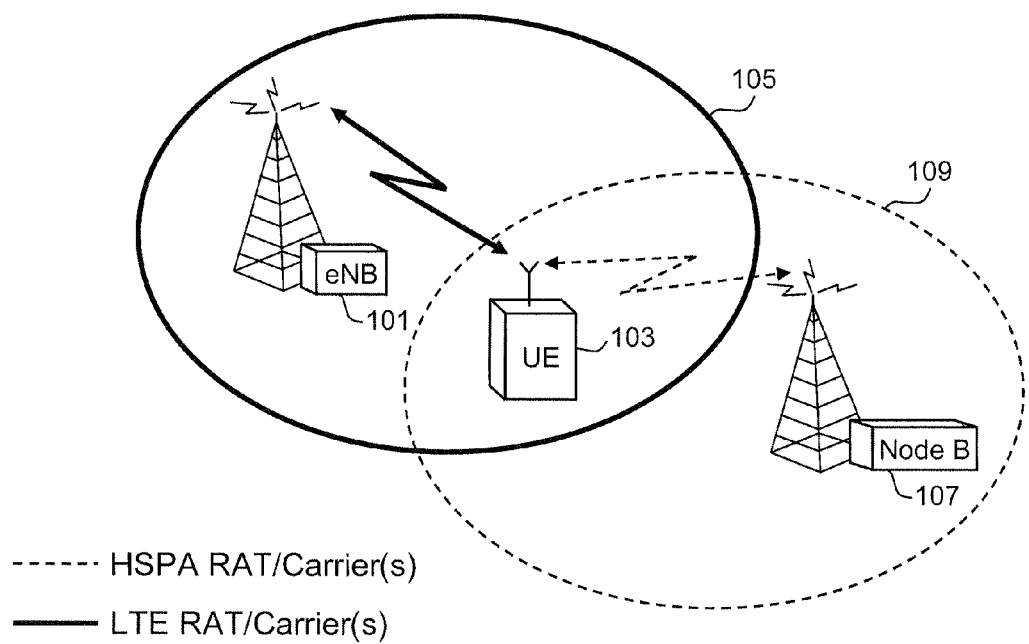
FIG. 2 illustrates a non-limiting example of a multi-RAT cellular radio communications system.
Figure 3:
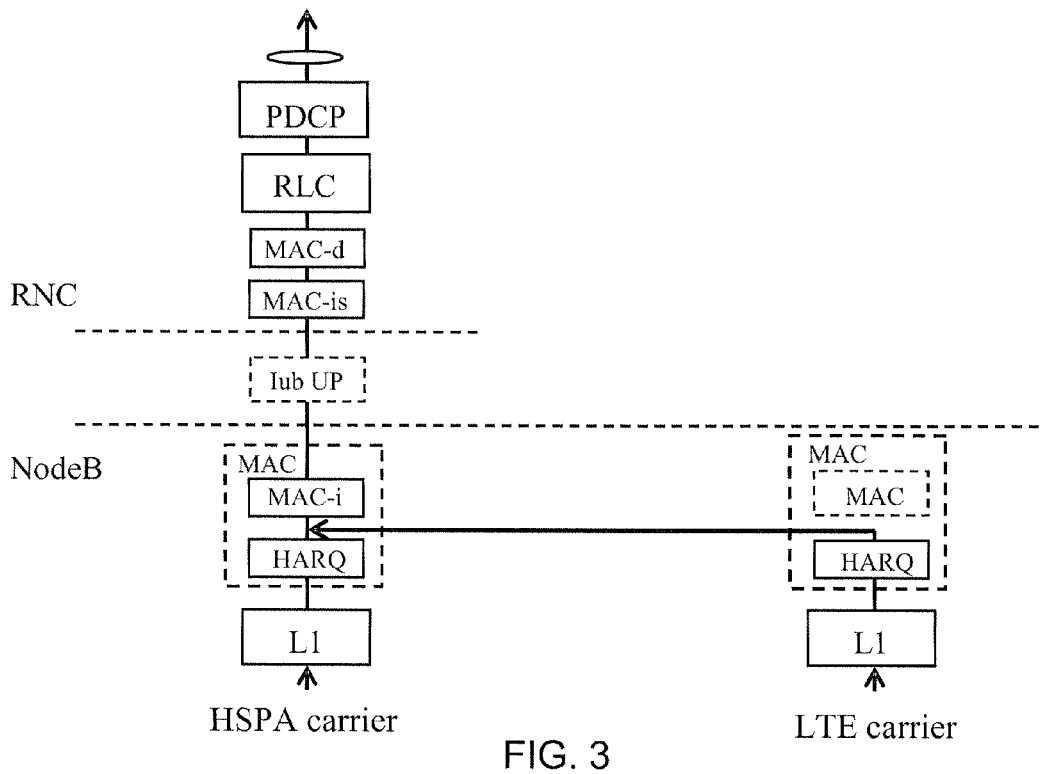
FIG. 3 illustrates multi-RAT system protocol stacks where a user equipment may obtain service using different radio access technologies (RATs)

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks may are shown in the figures corresponding to various nodes. Those skilled in the art will appreciate that the functions of those blocks may be implemented using individual hardware circuits, using software programs and data, in conjunction with a suitably programmed digital microprocessor or general purpose computer. Nodes that communicate using the air interface also have suitable radio communications circuitry. It will be recognized that various actions may be performed by specialized circuits (e.g., analog and/or discrete logic gates interconnected to perform a specialized function, applications specific integrated circuitry (ASIC), one or more digital signal processors (DSPs), etc.), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Although the non-limiting example embodiments described below relate to an example multi-RAT, multi-carrier system using HSPA and LTE, the technology may be applied to any cellular communications system that uses multiple (two or more) RATs.

Figure 4:
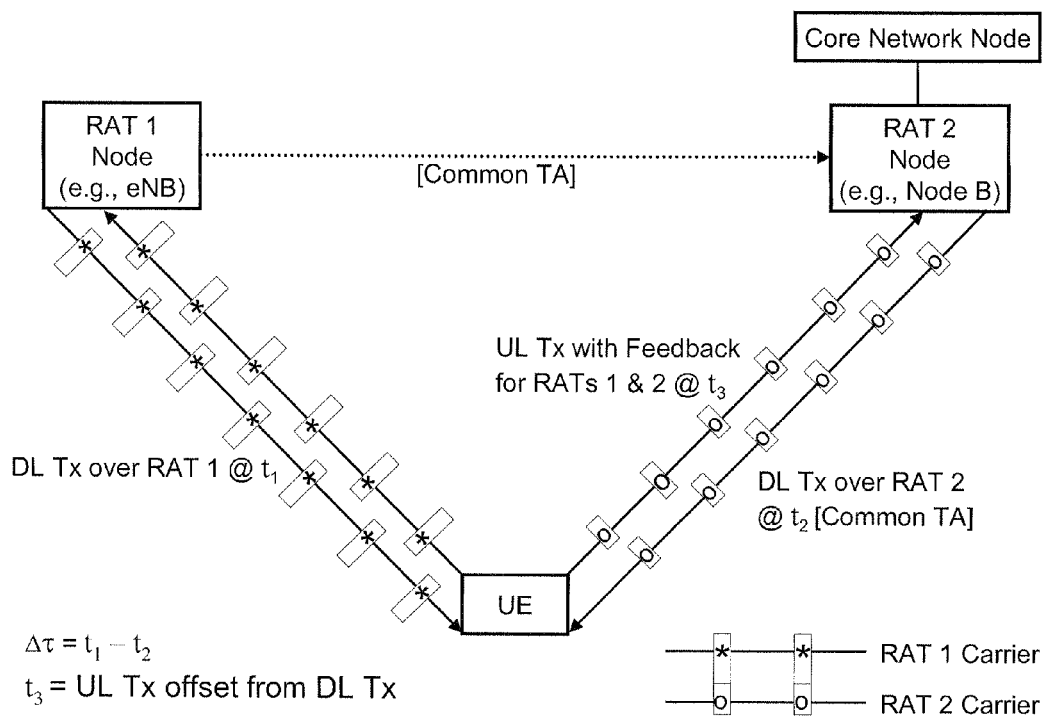
FIG. 4 is a non-limiting example diagram showing communication of a common timing adjustment (TA) parameter value in a multi-RAT communications system in accordance with one example embodiment.

The technology in this application estimates a common uplink timing adjustment command to be applied by the UE in a multi-RAT carrier aggregation system having at least two different RATs for adjusting the transmit timing of the uplink carriers belonging to the at least two different RATs. Referring to FIG. 4, a first network node (e.g., eNode B) operable in a multi-RAT carrier aggregation system according to a first RAT (RAT 1) estimates a common timing adjustment parameter value (e.g., a timing advance (TA) command governed by LTE principles) to be used by a UE capable of multi-RAT carrier aggregation for adjusting the transmit timing over the uplink carriers belonging to the at least two different RATs (e.g., HSPA and LTE). Estimating the common timing adjustment parameter value is preferably based on one of the two different RATs that requires one or more characteristics, approaches, or requirements of UE signals transmitted on one of the RATs, e.g., uplink orthogonality between UE transmissions received at a base station. If there are two or more RATs with the same characteristic or requirement, the common timing adjustment parameter value may be based on any of the two or more RATs.

In the non-limiting example embodiment shown in FIG. 4, the first network node signals the estimated common timing adjustment parameter value to a second network node operable in a multi-RAT carrier aggregation system according to a second different RAT (RAT 2). The second network node signals the common timing adjustment parameter value to the user equipment (UE), e.g., via a UE-specific or common downlink control channel using the RAT 2 radio technology. The two node approach may be well suited for architectures where a base station can be controlled by a controller, e.g., a Node B and an RNC. In another example embodiment, the first RAT 1 network node sends a common timing adjustment parameter value to a multi-RAT CA-capable UE directly. If LTE is the "primary" RAT for the UE, then the common timing adjustment parameter value may be sent by the DL control channel on LTE carrier, e.g., PDCCH. Alternatively, the common timing adjustment parameter value may be sent via an LTE carrier even when LTE is an auxiliary or "secondary" RAT in a multi-RAT CA system.

The UE operating in a multi-RAT carrier aggregation mode receives the common timing adjustment parameter value from the second network node or directly from the first network node, and based thereon, adjusts the transmit timing of the uplink carriers belonging to the multiple RATs (e.g., WCDMA and LTE carriers). The UE also preferably uses a downlink reference signal from one of the RAT nodes along with the common timing adjustment parameter value received from just one of the network nodes to adjust the transmit timing of the uplink carriers belonging to more than one RATs (e.g., WCDMA and LTE carriers). The carriers for each of the two different RATs are shown using different type lines. The downlink timing offset is shown as $\Delta\tau=t_1-t_2$, and the uplink transmission at transmit time $t_3$ offset from the downlink transmissions includes common feedback signaling for both of the network nodes. In addition, one or more additional pre-defined rules/criteria may be used to determine which RATs/carriers should be used for adjustment of the UL timing, e.g., based on cell bandwidth as described in more detail below.

In a non-limiting example, the first network node can be any base station, e.g., an eNode B serving LTE carriers. The first network node may also belong to any suitable RAT, e.g., LTE, HSPA, etc. The estimation of the common timing adjustment parameter value may be based on estimated propagation delays of uplink signals transmitted by all the UEs in a cell. The common timing adjustment parameter value is common to multiple RATs including a RAT that does not necessarily require a timing adjustment parameter value. For example, the common timing adjustment parameter value may be used to adjust the UE timing of WCDMA transmitted signals as well as the UE timing of LTE UL transmissions. As one non-limiting example, the common timing adjustment parameter value may be based on one of the multiple RATs that requires uplink transmission orthogonality from all UE transmissions received at the base station. If there are two or more RATs requiring uplink orthogonality, the common timing adjustment parameter value may be from any of those RATs that requires uplink transmission orthogonality from all UE transmissions received at the base station.

More generally, the first network node takes into account one or more characteristic(s) or requirement(s) of signals transmitted by the UE on one of the RATs (e.g., requirement on UL orthogonality for LTE). As mentioned above, additional UL timing-related rules/factors may also be used in multi-RAT carrier aggregation where carriers belong to multiple different frequency bands. More than one common TA command may be signaled if required due to carriers in different frequency bands. For example, the first node may estimate a common timing adjustment parameter value (TA) separately for each frequency band in RAT 1, e.g., TA 1 for a set of LTE/HSPA carriers in frequency carrier band $f_1$ and TA 2 for a set of LTE/HSPA carriers in frequency carrier band $f_2$. See the non-limiting example in FIG. 6 where common TA 1 and common TA 2 are sent from the RAT 2 node to the UE. Here, TA 1 may not be equal to TA 2 but instead may be common for all RATs in frequency band B1 and TA 2 may be common for all RATs in band B2. This is useful in the case where the frequency bands are substantially different, e.g., when frequency band $B_1$ and frequency band $B_2$ are in 800 MHz and 3500 MHz ranges, respectively. But if the frequency bands are closer, e.g., band $B_1$ and band $B_2$ are in 900 MHz and 700 MHz ranges, respectively, then one common timing adjustment parameter value may be used to adjust the UL timing of carriers belonging to both frequency bands. In one example implementation when $B_1$ and $B_2$ are closer or similar, the first network node (e.g., an LTE eNode B) determines the common TA value for all frequencies for both RAT 1 and RAT 2 based on band $f_1$ on which one of the RATs (e.g., LTE) operates.

If carriers in a multi-RAT carrier aggregation system are transmitted by/received at network nodes that are geographically separated (e.g., carriers transmitted by base stations and remote radio heads (RRHs)), one common TA value estimated by the first network node may apply to all carriers belonging to the multiple RATs for those geographically separated nodes.

In another non-limiting embodiment, where the first network node (e.g., LTE eNodeB) signals the estimated common timing adjustment to a second network node belonging to a different one of the multiple RATs (e.g., an HSPA node), the second network node may belong to the "primary" RAT, which can either be LTE or WCDMA in a non-limiting example. The carrier(s) belonging to the primary RAT may carry other information like UE-specific signaling information for scheduling in addition to the common timing adjustment. If the second network node is part of a WCDMA system (e.g., a Node B), the first network node (e.g., eNode B) signals the common timing adjustment value for each UE to the WCDMA node, which can be a radio network controller, a Node B, or some other network node capable of transmitting the common timing adjustment to each UE. The signaling of the common timing adjustment takes place over an interface between the first network node (e.g., eNode B) and the second network node (e.g., Node B). The common timing adjustment value may be signaled to the second network node "transparently" in a sense that the received timing adjustment may be sent to the UE without the second node reading the common timing adjustment parameter value. Alternatively, the second network node may completely or partially read the received common timing adjustment information.

Figure 7:
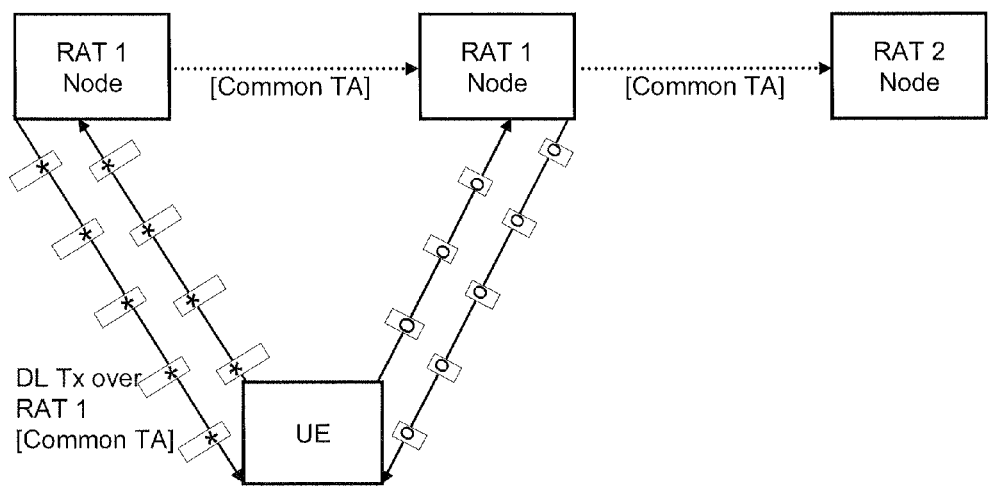
FIG. 7 is a non-limiting example diagram showing communication of a common timing adjustment (TA) parameter value between network nodes in a multi-RAT communications system in accordance with another example embodiment.

FIG. 7 is a non-limiting example diagram showing communication of a common timing adjustment parameter value between network nodes in a multi-RAT communications system in accordance with another example embodiment. Here, the first network node also operates on the primary RAT like the second network node, e.g., there is no RNC so the features are implemented in the base station. In this situation, the RAT 1 network node sends the common TA directly to the UE. The common TA value may also be sent to a node belonging to another RAT 2 for information purposes, either directly or via another RAT 1 node as shown, for collecting statistics, network management, or for adjusting the downlink timing of radio links involved in a soft handover (SHO).

Figure 5:
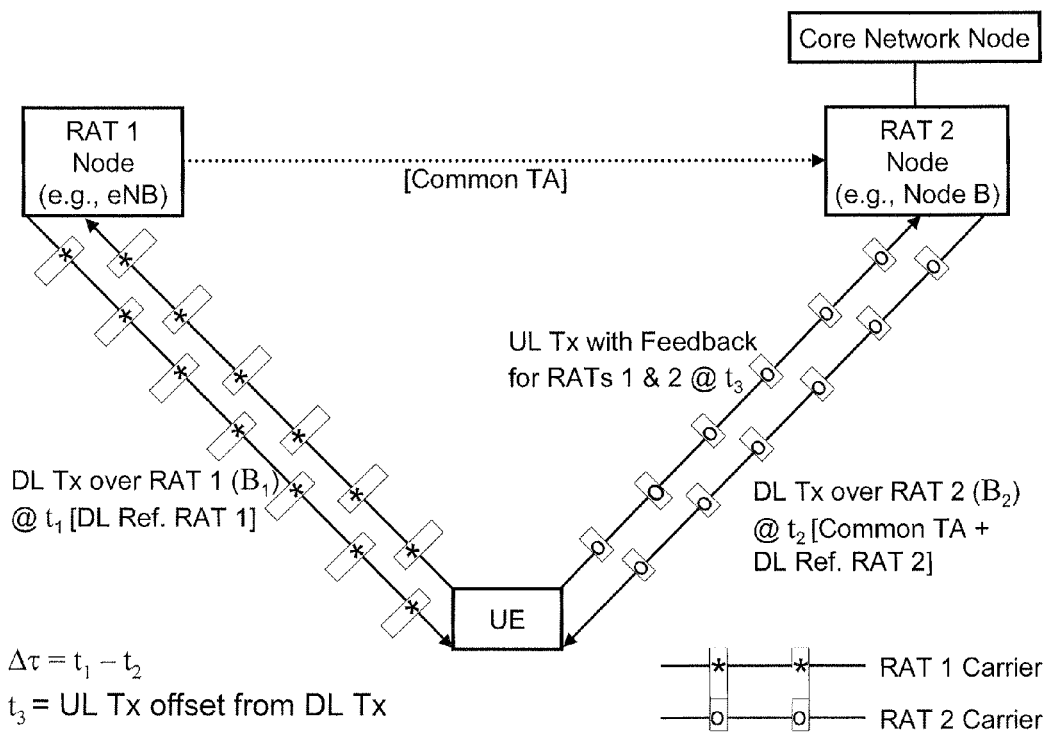
FIG. 5 is a non-limiting example diagram showing communication of a common timing adjustment (TA) parameter value and downlink reference signals in a multi-RAT communications system in accordance with another example embodiment.
Figure 6:
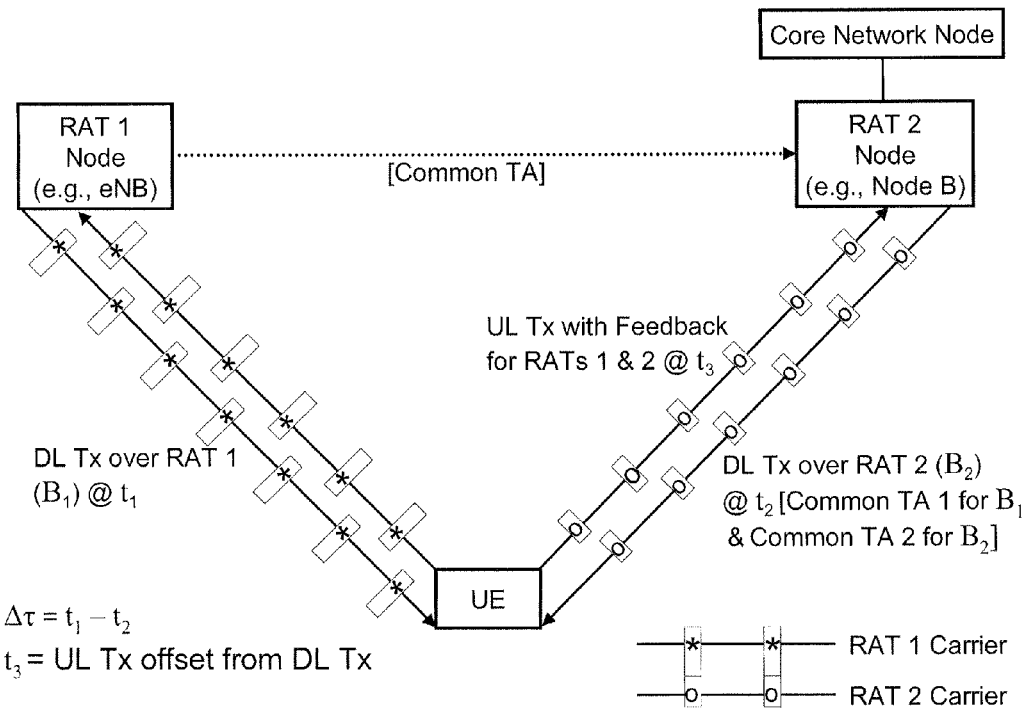
FIG. 6 is a non-limiting example diagram showing communication of two common timing adjustment (TA) parameter values for two different carriers in one of the RAT nodes in a multi-RAT communications system in accordance with another example embodiment.

The second network node (e.g., the node belonging to the primary RAT in a multi-RAT CA system, such as Node B in WCDMA or eNode B in LTE) in the example embodiments shown in FIGS. 4-6 or the first network node in the example embodiment in FIG. 7 signals the common TA value received from the first network node to the UE over the radio interface. The common TA value may be transparently encapsulated in a control channel message or non-transparently, i.e., after decoding and processing the received common TA value from the first network node. The control channel carrying the common TA value may belong to any of the multiple RATs, e.g., either HSPA or LTE in the non-limiting example. If HSPA is the primary system, then the common TA value may be sent by the DL control channel on an HSPA control channel carrier, e.g., HS-SCCH. The HS-SCCH may need re-formatting so that it can accommodate and carry the common TA parameter value. Alternatively, the common TA parameter value may be sent over a downlink dedicated or shared data channel on an HSPA carrier, e.g., HS-DSCH. This may be appropriate when there is a need to transmit data over an HSPA carrier. The transmission of a common TA parameter value over the HS-DSCH can be incorporated in higher layer signaling, e.g., RRC or SRB multiplexing over the HS-DSCH. In such a case, the UE is preferably aware that this pre-defined signaling sent over HS-DSCH is related to the common TA parameter value.

Thus, a UE operating in multi-RAT carrier aggregation receives the common TA value from the second (or first) network node, and based thereon, adjusts the transmit timing of the uplink carriers belonging to multiple RATs (e.g., WCDMA and LTE carriers). Although the signals from different RATs are time-aligned in that they are sent at the same time, there still may be some minor time misalignment error. As a result, each RAT may also transmit its own common reference/pilot signal. For example, LTE and WCDMA/HSPA carriers transmit a CRS and a common pilot channel (CPICH), respectively. The UE receiver is capable of receiving these signals since the UE is multi-RAT CA capable. The UE can use any one of the two sets of common reference/pilot signals to adjust UL transmit timing of the carriers of more than one RAT. For example, the UE can use LTE DL common reference signals for UL transmit timing adjustment of LTE carriers as well as HSPA carriers.

In one non-limiting example implementation, the UE may choose to use a downlink reference signal for the uplink transmit timing adjustment that is sent on the WCDMA or LTE carrier with the largest bandwidth. For example, if the WCDMA/HSPA carrier BW is 5 MHz and the LTE BW is 10 MHz, then the UE uses the LTE common reference signal (i.e., CRS) for the UL timing adjustment. But if the LTE BW is 3 MHz, then the UE uses the WCDMA/HSPA common reference signal (i.e. CPICH) for the UL timing adjustment. This example approach ensures that the UL transmit timing error is minimized or at least less than it would otherwise be.

Alternatively, the UE may use a downlink reference signal for uplink transmit timing adjustment signals of only the primary carrier of the primary system, e.g., the UE uses the CPICH if the primary system is WCDMA or uses the CRS if the primary system is WCDMA. Alternatively, the UE may use a downlink reference signal for uplink transmit timing adjustment signals of only the primary carrier of one of the RATs, e.g., the UE uses LTE.

The UE transmit timing adjustments based on the received common TA parameter value and the DL common reference signals are preferably independent operations. In order to adjust the transmit timing based on a DL common reference signal, the UE regularly monitors the DL common reference signals. For example, the UE may regularly correlate the received DL common reference signal with the known DL common reference signal to determine if the DL timing of the cell has changed. If a drift in the cell timing is detected, then the UE adjusts its UL timing. On the other hand, the common TA parameter value is typically only applied to adjust the UL timing when a new common TA parameter value is received by the UE. For example, if the common TA parameter value is sent by the network node to the UE in a UE-specific DL control channel the UE needs to monitor that DL control channel for the possible reception of the common TA value.

An example of an additional pre-defined rules/criteria that may further be used to for adjustment of the UL timing is cell transmission bandwidth. In LTE, for example, the cell transmission bandwidth (BW) is variable, e.g., the BW of each LTE carrier can be 1.4, 3, 5, 10, or 20 MHz. The UE transmit timing adjustment may involve some error, and an adjustment based on a smaller BW carrier involves a larger error, i.e., a UE UL transmit timing adjustment step has a larger error if the cell transmission BW is small. Consider as an example an error on the order of ±24 Ts (1 Ts=32.5 ns) in case of 1.4 MHz as compared to ±12 Ts in case of 10 MHz (see section 7.1.2 in 36.133) because of the lower sampling rate used by the UE when the BW is smaller. In multi-RAT CA, the UE may be operating with different BWs for different RATs. For example, 5 MHz for HSPA and 3 MHz for LTE. Since the UE transmit timing error is smaller for larger BWs, to reduce the transmit timing error the UE may adjust the UL transmit timing of all carriers based on the carrier with largest BW, (e.g., use HSPA to transmit the common TA parameter value in the case where the LTE carrier is 3 MHz). In this way, error due to the adjustment of the UE transmit timing can be reduced.

The UE may also use the common TA parameter value to adjust the UL transmit timing of carriers belonging to different RATs when the UE has multiple radio links in one of the RATs, e.g., multiple WCDMA carriers in a soft handover. In this case, the UE uses the same transmit timing for all uplink transmissions for the same signals to all the base stations involved in soft handover. In the downlink, the UE combines the signals received from all the radio links in soft handover. The UE combines the signals from the radio links provided they are received within the time window, e.g., a time window of T0±148 chips, where T0=1024 chips for SHO in HSPA. The HSPA network node (e.g., an RNC or other suitable HSPA network node) may adjust the DL timing of the radio links involved in soft handover based on the HSPA signals received from the UE and/or the common TA information if available from the first network node. In this way, the HSPA network can guarantee that the UE in soft handover receives the signals from all the radio links within the time window.

Figure 8:
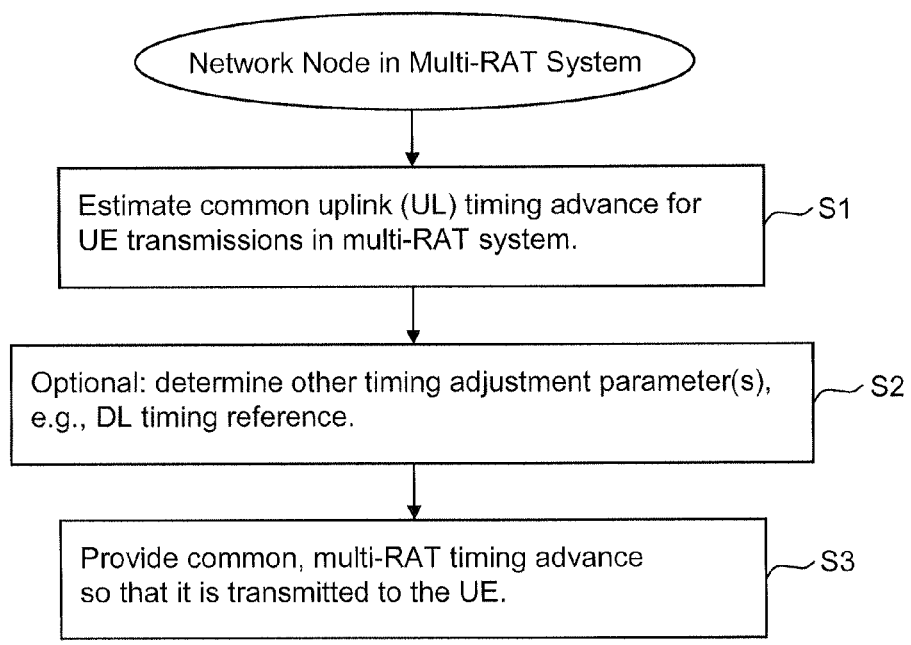
FIG. 8 is a flowchart diagram illustrating example, non-limiting steps for a network node in a multi-RAT network.

FIG. 8 is a flowchart diagram illustrating example, non-limiting steps for a network node in a multi-RAT network. The network node estimates a common uplink timing adjustment such as a timing advance command for UE transmissions in a multi-RAT network/system (step S1). Optional step S2 permits the network node to determine one or more other timing adjustment parameter values or signals, e.g., a downlink timing reference signal. The network node provides either directly or via another node(s) at least the common timing adjustment parameter value, as well as one or more other parameter values or signals if desired, so that this information is transmitted to the UE (step S3).

Figure 9:
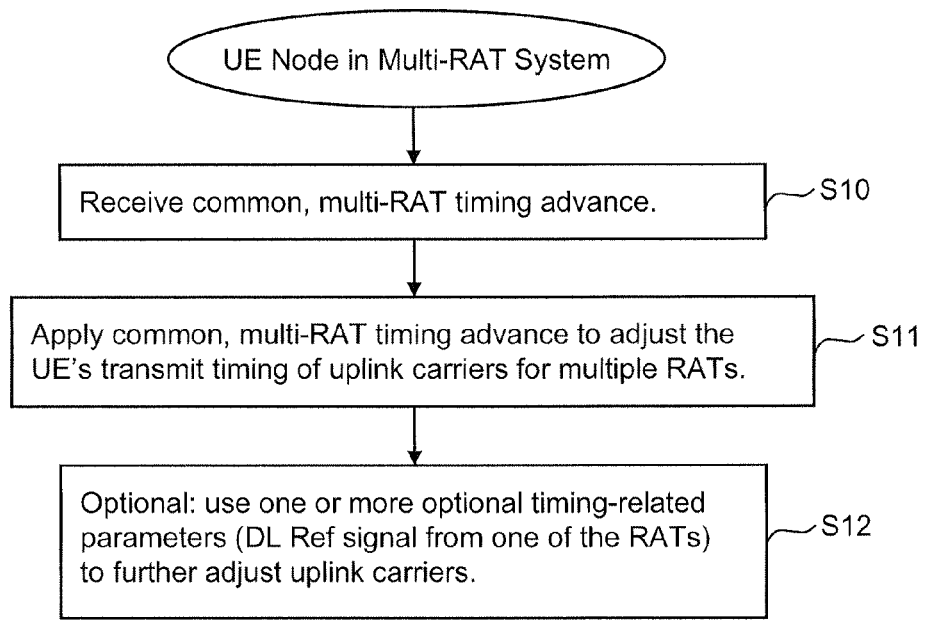
FIG. 9 is a flowchart diagram illustrating example, non-limiting steps for a UE node in a multi-RAT system.

FIG. 9 is a flowchart diagram illustrating example, non-limiting steps for a UE node in a multi-RAT system. The UE receives a common, multi-RAT timing adjustment parameter value (step S10) and applies it to adjust the UE's transmit timing over one or more uplink carriers associated with each of the multiple RATs that the UE is communicating with (step S12). Optionally, the UE may use one or more timing-related parameter values or signals (e.g., a downlink reference signal) to further adjust transmit timing over uplink carriers (step S12).

Figure 10:
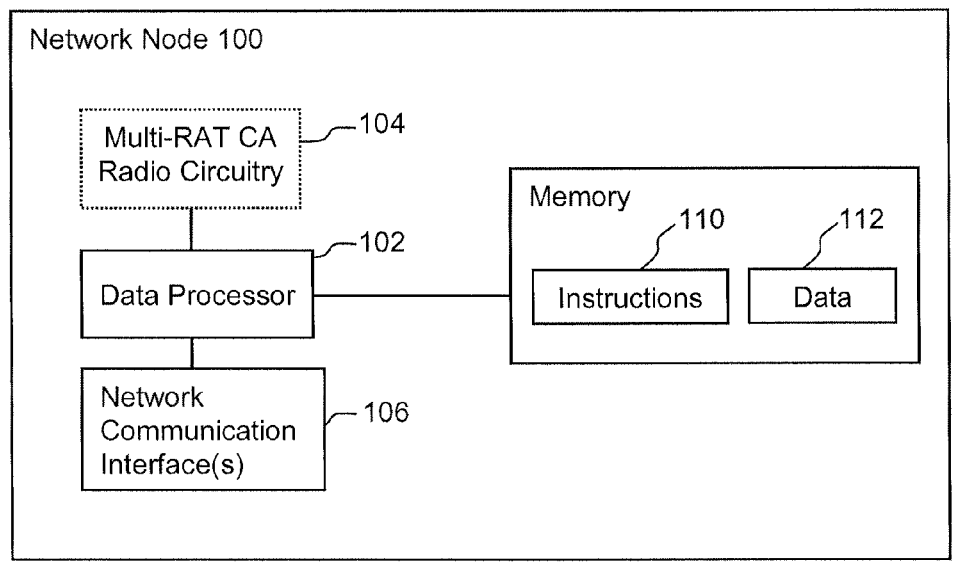
FIG. 10 is an example, non-limiting function block diagram of a network node in a multi-RAT network.

FIG. 10 is an example, non-limiting function block diagram of a network node 100 for use in a multi-RAT network that may be used to implement operations regarding determining the common TA, sending the common TA to the UE and/or to other network nodes, and if desired, transmitting a downlink reference signal which in turn may be used by the UE for the uplink transmit timing adjustment as described above. A data processor 102 controls overall operation of the network node 100. The network node 100 may be a radio network node (e.g., a base station, access point, etc.), and in that case, includes multiple RAT, carrier aggregation radio communications circuitry 104. Alternatively or additionally, the network node 100 may be a core network, a network controller (e.g. RNC, BSC etc) or other network node in which case radio circuitry may not be needed unless that node communicates wirelessly. The data processor 102 connects to one or more network communication interface(s) 106 and to memory 108. The memory 108 includes program instructions 110 for estimating a common timing adjustment (TA) parameter value, and if desired, a downlink reference signal for uplink transmit timing adjustment and data 112 and/or one or more other parameter values or signals.

Figure 11:
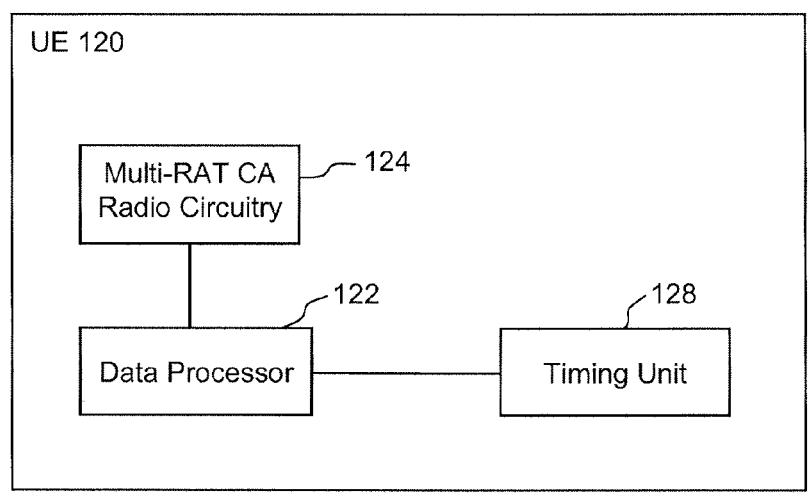
FIG. 11 is an example, non-limiting function block diagram of a UE for use in a multi-RAT system.

FIG. 11 is an example, non-limiting function block diagram of a UE 120 for use in a multi-RAT system that may be used to implement UE-related operations described above. The UE 120 includes a data processor 122 that controls the overall operation of the UE and is coupled to multi-RAT carrier aggregation (CA) radio circuitry 124 for making and receiving multi-RAT radio communications, e.g., with multiple different types of radio access networks. The processor 122 is coupled to memory that stores programs instructions for performing the necessary operations of the UE. Data processor 122 is also coupled to a timing unit 128. The multi-RAT carrier aggregation radio circuitry 124 receives the common TA parameter value, and the data processor 122 and/or timing unit 128 interprets the common TA parameter value in order to determine the UL transmit timing adjustment required based on the received TA parameter value. The multi-RAT carrier aggregation radio circuitry 124 receives the downlink reference signals also used for adjusting its UL transmit timing. Based on the timing adjustment(s) from the data processor 122, the timing unit 128 generates the necessary timing signals for receiving and transmitting signals with the different RAT networks.

Figure 12:
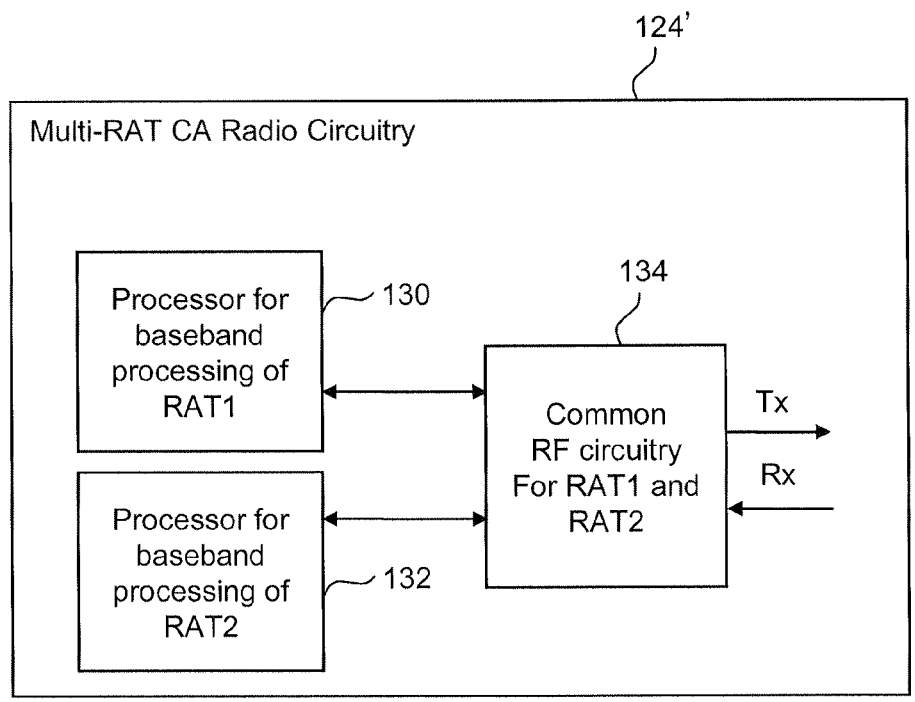
FIG. 12 is a function block diagram of a multi-RAT CA radio circuitry for UE in one example, non-limiting embodiment.
Figure 13:
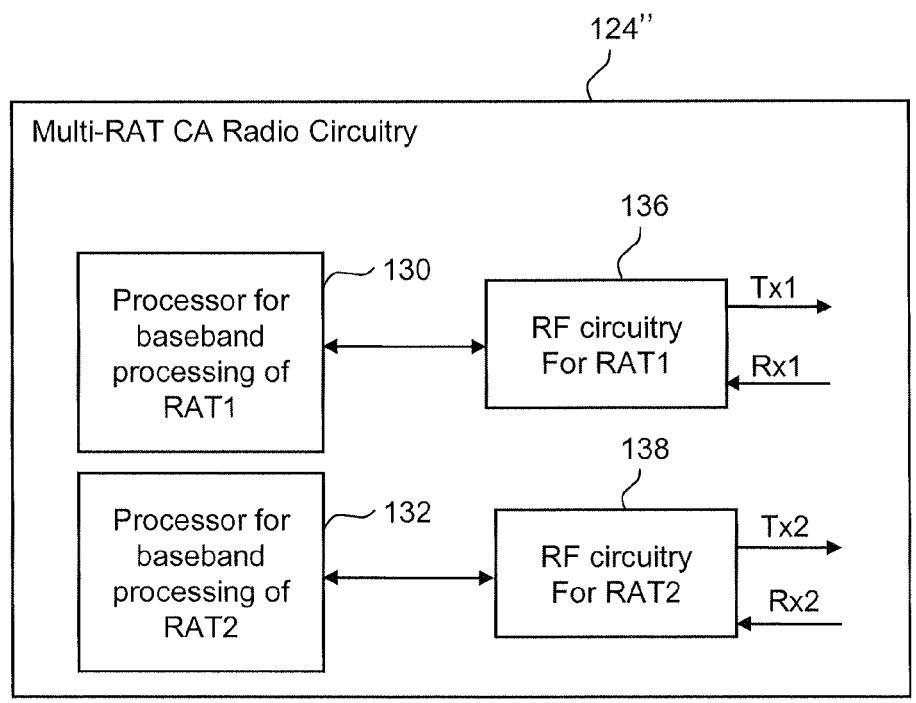
FIG. 13 is a function block diagram of a multi-RAT CA radio circuitry for UE in another example, non-limiting embodiment.

Additional details related to multi-RAT circuitry are shown in FIGS. 12 and 13. FIG. 12 is a function block diagram of a multi-RAT CA radio circuitry 124' for UE 120 in one example, non-limiting embodiment. Processor 130 performs baseband processing for RAT1, and processor 132 performs baseband processing for RAT2. Alternatively, that baseband processing may be performed by one processor or by more than two processors. Processors 130 and 132 are coupled to common RF circuitry 134 in FIG. 12. FIG. 13 is a function block diagram of a multi-RAT CA radio circuitry 124" for UE 120 in another example, non-limiting embodiment. Here, each processor 130 and 132 has corresponding RF circuitry 136 and 138, respectively.

There are many advantages to the technology described. One advantage is that the described technology can ensure that one or more characteristics or requirements for one of the multiple RATs is provided or met such as different timing and/or orthogonality requirements. For example, UL orthogonality can be maintained on LTE carriers even though HSPA do not require UL orthogonality. Regardless whether the RATs require UL orthogonality or not can be easily aggregated without leading to any degradation due to any possible loss in UL orthogonality. UE and base station complexity may also be also reduced because the technology avoids the concerns about the reduced processing budget explained in the background section. There is no UL performance loss associated with UL orthogonality since UL orthogonality is maintained. (Normally, UL orthogonality loss must be compensated by higher UL transmit power which in turn increases UL interference and waste of the UE transmit power). The technology also does not adversely impact the UE sending UL control channel feedback information because the timing adjustment is common to the RAT carriers. Soft handover (SHO) in multi-RAT CA mode for an HSPA carrier can be executed so that an RNC can ensure WCDMA transmit timing of all cells in SHO is within the prescribed limit.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

What is claimed is:

1. A method of operating a user equipment (UE) in a multiple radio access technology (multi-RAT) communications system, the user equipment comprising multi-RAT radio transmission circuitry and multi-RAT radio receiving circuitry, the method comprising:
    operating the multi-RAT radio receiving circuitry to concurrently receive at least a first downlink carrier associated with a first RAT and at least a second different downlink carrier associated with a second RAT, wherein the first and second RATs have different carrier bandwidths;
    receiving on one of the first and second downlink carriers a common timing adjustment parameter value that is common to both the first and second RATs;
    using the common timing adjustment parameter value to adjust a transmit timing of a first uplink carrier associated with the first RAT and of a second uplink carrier associated with the second RAT independently from using a downlink common reference signal to adjust the transmission timing of the first uplink carrier and the second uplink carrier.

2. The method in claim 1, wherein the multi-RAT communications systems is a multi-RAT, multi-carrier communications system with the first RAT having a first group of uplink carriers and the second RAT having a second group of uplink carriers, the method further comprising:
    using the common timing adjustment parameter value to adjust a transmit timing of one or more of the first group of uplink carriers and of one or more of the second group of uplink carriers.

3. The method in claim 2, wherein the common uplink timing adjustment parameter value is used to ensure that signals transmitted from UEs in a cell area are received by a base station serving the cell area with a high degree of orthogonality.

4. The method in claim 2, wherein the first RAT and second RAT must meet different uplink transmit or uplink orthogonality requirements.

5. The method in claim 2, wherein the common timing adjustment parameter value is based on one of the first and second RATs that requires uplink orthogonality between uplink signals received by a base station from different UEs.

6. The method in claim 2, the method further comprising adjusting a transmit timing of one or more of the first group of uplink carriers and of one or more of the second group of uplink carriers using an uplink transmit timing that minimizes an uplink transmit timing error between different UEs transmitting to a base station.

7. The method in claim 2, further comprising:
    selecting one of the downlink carriers for use as a reference downlink carrier;
    ascertaining a timing of the reference downlink carrier; and
    determining a transmission time period based on said ascertained timing of said downlink reference carrier and an offset specified by the common timing adjustment parameter value, wherein the transmission time period comprises a transmission start time and a transmission stop time; and
    initiating transmission of information on the one or both of the first and second uplink carriers based on the transmission start time and transmission stop time.

8. The method in claim 2, wherein a first common timing adjustment parameter value is associated with a first one of the first and second groups of uplink carriers and a second different common timing adjustment parameter value is associated with the same one of the first and second groups of uplink carriers.

9. The method in claim 8, wherein the first and second groups of uplink carriers belong to different frequency bands.

10. The method in claim 1, further comprising receiving the common timing adjustment parameter value over a UE-specific channel or a common control channel.

11. The method in claim 1, wherein the first RAT is Long Term Evolution (LTE)-based and the second RAT is High Speed Packet Access (HSPA)-based.

12. The method in claim 1, further comprising adjusting a transmit timing of the first uplink carrier and the second uplink carrier using an uplink transmit timing associated with one of the carriers having a larger bandwidth.

13. A method in a multiple radio access technology (multi-RAT) communications network where radio communications between the network and user equipments (UEs) is performed using multi-RAT radio transmission circuitry and multi-RAT radio receiving circuitry, the method comprising:
    estimating a common uplink timing adjustment parameter value for UE transmissions in the multi-RAT communications network, and
    providing the common uplink timing adjustment parameter value for transmission to one or more UEs,
    wherein the common uplink timing adjustment parameter value is common to both a first RAT and a second different RAT and useable by the one or more UEs to adjust transmit timing of uplink carriers belonging to the first and second RATs independently from using a downlink common reference signal to adjust the transmission timing of the first uplink carrier and the second uplink carrier.

14. The method in claim 13, wherein the steps of claim 13 are performed in a first network node, the method further comprising the first network node signaling the estimated timing adjustment parameter value to a second network node that then transmits the estimated timing adjustment parameter value to the one or more UEs.

15. The method in claim 13, wherein the steps of claim 13 are performed in a base station.

16. The method in claim 13, wherein the common timing adjustment parameter value is provided in order to coordinate UE transmit timing of a first uplink carrier associated with the first RAT and of a second uplink carrier associated with the second RAT.

17. The method in claim 13, wherein the multi-RAT communications network is a multi-RAT, multi-carrier communications network with the first RAT having a first group of uplink carriers and the second RAT having a second group of uplink carriers, the method further comprising:
using the common timing adjustment parameter value to coordinate a transmit timing of one or more of the first group of uplink carriers and of one or more of the second group of uplink carriers.

18. The method in claim 17, wherein the common timing adjustment parameter value is used to ensure that signals transmitted from UEs in a cell area are substantially simultaneously received by a base station serving the cell area with a high degree of orthogonality.

19. The method in claim 17, wherein the first RAT and second RAT use different uplink requirements or approaches.

20. The method in claim 19, wherein the common timing adjustment parameter value is estimated based on one of the first and second RATs that requires uplink orthogonality between uplink signals received by a base station from different UEs.

21. The method in claim 17, wherein base station nodes in the multi-RAT, multi-carrier communications network each transmits a downlink carrier timing reference signal that is separate from and additional to the common timing adjustment parameter value.

22. The method in claim 13, wherein the first and second RATs have different carrier bandwidths and the common uplink timing adjustment parameter value is useable by the one or more UEs to adjust transmit timing of a first uplink carrier associated with the first RAT and a second uplink carrier associated with the second RAT using an uplink transmit timing associated with one of the uplink carriers having a larger bandwidth.

23. A user equipment (UE) for use in a multiple radio access technology (multi-RAT) communications system, the user equipment comprising:
multi-RAT radio circuitry configured to concurrently receive at least a first downlink carrier associated with a first RAT and at least a second different downlink carrier associated with a second RAT, where the first and second RATs have different carrier bandwidths, where one of the first and second downlink carriers includes a common timing adjustment parameter value that is common to both the first and second RATs, and
a data processor configured to use the common timing adjustment parameter value to adjust a transmit timing of a first uplink carrier associated with the first RAT and of a second uplink carrier associated with the second RAT independently from using a downlink common reference signal to adjust the transmission timing of the first uplink carrier and the second uplink carrier.

24. The UE in claim 23, wherein the multi-RAT communications systems is a multi-RAT, multi-carrier communications system with the first RAT having a first group of uplink carriers and the second RAT having a second group of uplink carriers, and wherein the data processor is configured to use the common timing adjustment parameter value to adjust a transmit timing of one or more of the first group of uplink carriers and of one or more of the second group of uplink carriers.

25. The UE in claim 24, wherein the common timing adjustment parameter value is based on one of the first and second RATs that requires uplink orthogonality between uplink signals received by a base station from different UEs, and wherein the common timing adjustment parameter value is used to ensure that signals transmitted from UEs via the one RAT in a cell area are received by a base station serving the cell area with a high degree of orthogonality.

26. The UE in claim 24, wherein the data processor is configured to adjust a transmit timing of one or more of the first group of uplink carriers and of one or more of the second group of uplink carriers using an uplink transmit timing that minimizes an uplink transmit timing error between different UEs transmitting to a base station.

27. The UE in claim 24, wherein the data processor is configured to:
select one of the downlink carriers for use as a reference downlink carrier;
ascertain a timing of the reference downlink carrier; and
determine a transmission time period based on said ascertained timing of said downlink reference carrier and an offset specified by the common timing adjustment parameter value, wherein the transmission time period comprises a transmission start time and a transmission stop time; and
initiate transmission of information on the one or both of the first and second uplink carriers via the multi-RAT radio circuitry based on the transmission start time and transmission stop time.

28. The UE in claim 23, wherein the data processor is configured to adjust a transmit timing of the first uplink carrier and the second uplink carrier using an uplink transmit timing associated with one of the carriers having a larger bandwidth.

29. Apparatus in a multiple radio access technology (multi-RAT) communications network where radio communications between the network and user equipments (UEs) is performed using multi-RAT radio transmission circuitry and multi-RAT radio receiving circuitry, the apparatus comprising:
data processor circuitry configured to estimate a common uplink timing adjustment parameter value for UE transmissions in the multi-RAT communications network, and
communications circuitry configured to provide the common uplink timing adjustment parameter value for transmission to one or more UEs,
wherein the common uplink timing adjustment parameter value is common to both a first RAT and a second different RAT and useable by the one or more UEs to adjust transmit timing of uplink carriers belonging to the first and second RATs independently from using a downlink common reference signal to adjust the transmission timing of the first uplink carrier and the second uplink carrier.

30. The apparatus in claim 29, wherein the apparatus is in a first network node configured to use one of the RATs and to signal the estimated timing adjustment parameter value to a second network node that uses the other of the RATs to transmit the estimated timing adjustment parameter value to the one or more UEs.

31. The apparatus in claim 29, wherein the common timing adjustment parameter value is provided in order to coordinate UE transmit timing of a first uplink carrier associated with the first RAT and of a second uplink carrier associated with the second RAT.

32. The apparatus in claim 29, wherein data processor is configured to estimate the common timing adjustment parameter value based on one of the first and second RATs that requires uplink orthogonality between uplink signals received by a base station from different UEs.

33. The apparatus in claim 29, wherein base station nodes in the multi-RAT, multi-carrier communications network each transmits a downlink carrier timing reference signal that is separate from and additional to the common timing adjustment parameter value.

34. The apparatus in claim 29, wherein the first and second RATs have different carrier bandwidths and the common uplink timing adjustment parameter value is useable by the one or more UEs to adjust transmit timing of a first uplink carrier associated with the first RAT and a second uplink carrier associated with the second RAT using an uplink transmit timing associated with one of the uplink carriers having a larger bandwidth.

* * * * *